US008683217B2

(12) United States Patent
Gammel et al.

(10) Patent No.: US 8,683,217 B2
(45) Date of Patent: Mar. 25, 2014

(54) DEVICE AND METHOD FOR TRANSMITTING DATA IN AN ENCRYPTED MANNER

(75) Inventors: Berndt Gammel, Markt Schwaben (DE); Dietmar Scheiblhofer, Kaindorf (AU)

(73) Assignee: Infineon Technologies AG, Munich (DE)

( * ) Notice: Subject to any disclaimer, the term of this patent is extended or adjusted under 35 U.S.C. 154(b) by 2326 days.

(21) Appl. No.: 11/390,546

(22) Filed: Mar. 24, 2006

(65) Prior Publication Data

US 2006/0233360 A1   Oct. 19, 2006

(30) Foreign Application Priority Data

Mar. 24, 2005 (DE) .................. 10 2005 013 830

(51) Int. Cl.
 *G06F 11/30* (2006.01)
(52) U.S. Cl.
 USPC ..................... 713/189; 713/194; 380/277
(58) Field of Classification Search
 USPC .................. 380/255; 713/189, 194; 726/9
 See application file for complete search history.

(56) References Cited

U.S. PATENT DOCUMENTS

| 6,209,098 | B1 | 3/2001 | Davis |
| 7,673,140 | B2 * | 3/2010 | Evoy .............................. 713/168 |
| 2002/0169968 | A1 * | 11/2002 | Gammel et al. .............. 713/189 |
| 2003/0163725 | A1 | 8/2003 | Feuser et al. |

FOREIGN PATENT DOCUMENTS

| DE | 197 82 075 C2 | 11/2001 |
| DE | 101 62 310 A1 | 7/2003 |

OTHER PUBLICATIONS

Guilley, Sylvain, and Renaud Pacalet. "SoCs security: a war against side-channels." In Annales des télécommunications, vol. 59, No. 7-8, pp. 998-1009. Springer-Verlag, 2004.*

* cited by examiner

*Primary Examiner* — Jeffrey Pwu
*Assistant Examiner* — Carlos Amorin
(74) *Attorney, Agent, or Firm* — Schiff Hardin LLP

(57) ABSTRACT

A device according to the present invention is configured for transmitting data between two semiconductor chips of a data processor in an encrypted manner, wherein a first semiconductor chip is connected to a second semiconductor chip. The device includes a non-volatile memory element in each of the two semiconductor chips, wherein an encryption initial value for an encryption rule is stored in the memory element of the first semiconductor chip and a decryption initial value associated to the encryption initial value for a decryption rule associated to the encryption rule is stored in the memory element of the second semiconductor chip. Additionally, the first semiconductor chip has a first data transmission interface formed to generate an encryption data stream from an input data stream using the encryption initial value according to the encryption rule. Also, the second semiconductor chip has a second data transmission interface formed to receive the encryption data stream and to generate a decryption data stream from the encryption data stream using the decryption initial value according to the decryption rule and to compare the decryption data stream generated to an expected data stream, wherein the second data transmission interface is also formed to perform a defensive measure against transmitting data from the second data transmission interface to the first data transmission interface when the decryption data stream does not correspond to the expected data stream.

25 Claims, 1 Drawing Sheet

DEVICE AND METHOD FOR TRANSMITTING DATA IN AN ENCRYPTED MANNER

CROSS-REFERENCE TO RELATED APPLICATION

This application claims priority from German Patent Application No. 10 2005 013 830.6, which was filed on Mar. 24, 2005, and is incorporated herein by reference in its entirety.

BACKGROUND OF THE INVENTION

1. Field of the Invention

The present invention relates to the technical field of cryptography and, in particular, the present invention relates to the technical sub-field of the cryptographic protection of a data exchange of two semiconductor chips.

2. Description of Related Art

Due to the clear increase in complexity in modern algorithms or circuits, the area available on a single semiconductor chip frequently is no longer sufficient to guarantee a compact integrated circuit and thus, by a small line length in this circuit, fast processing of such complex algorithms on the individual semiconductor chip is difficult to achieve. In order to counter this problem, two chips are frequently connected to each other in the prior art, as is exemplarily illustrated in FIG. 2. For this, an upper chip 200 is exemplarily connected to a lower chip 202 such that a first pad 204 of the upper chip is opposite a second pad 206 of the lower chip 202 and thus a contacting from the upper chip 200 to the lower chip 202 via corresponding contact points 208 is possible. However, such a partitioning of the processing of an algorithm or partitioning of a corresponding safety controller into two chips entails, additional safety risks and requires safety measures against new attack scenarios. When these two chips are connected to each other in the so-called face-to-face technology (F2F technology) and when it can be assumed that it is technically only possible entailing extreme efforts to separate the two chips from each other without destroying at least one of the chips, simple safety measures are possible to prevent spying out data from the one chip still functioning. Simple safety measures of this kind against spying out data of a chip still functioning are known to a person skilled in the art. Recent findings, however, have revealed that the chips may really be separated entailing reasonable efforts, such as, for example, by means of selective etching so that both chips on their own are still functioning. A potential attacker thus has the possibility to re-connect the two chips again by lines and, with regard to the communication between the two chips (such as, for example, between the upper chips 200 and the lower chip 202) via the contact points 208, to a) intercept and
b) manipulate the communication (such as, for example, by a "man-in-the-middle" attack).

SUMMARY OF THE INVENTION

It is an object of the invention to provide a way of being able to transmit data between two semiconductor chips in an intercepting and manipulating-safe manner, and this protection against interception or manipulation should be realized through simple technical measures. Additionally, it is the object of the invention to provide a method for operating a device for transmitting data between two semiconductor chips and a method for personalizing two semiconductor chips to allow an intercepting and manipulating-safe data transmission between the two semiconductor chips.

In accordance with a first aspect of the present invention, a device is configured for transmitting data between two semiconductor chips of data processing means in an encrypted manner; with a first semiconductor chip being connected to a second semiconductor chip. The device includes a non-volatile memory element (in each of the two semiconductor chips), wherein an encryption initial value for an encryption rule is stored in the memory element of the first semiconductor chip and a decryption initial value associated to the encryption initial value for a decryption rule associated to the encryption rule is stored in the memory element of the second semiconductor chip. The first semiconductor chip has a first data transmission interface formed to generate an encryption data stream from an input data stream using the encryption initial value according to the encryption rule; wherein the second semiconductor chip has a second data transmission interface formed to receive the encryption data stream and to generate a decryption data stream from the encryption data stream using the decryption initial value according to the decryption rule and to compare the decryption data stream generated to an expected data stream. The second data transmission interface is further formed to perform a defensive measure against transmitting data from the second data transmission interface to the first data transmission interface when the decryption data stream does not correspond to the expected data stream.

In accordance with a second aspect of the present invention, a method is configured for operating a device for transmitting data between two semiconductor chips of data processing means in an encrypted manner, wherein the device for transmitting in an encrypted manner has a non-volatile memory element in each of the two semiconductor chips. An encryption initial value for an encryption rule is stored in a memory element of the first semiconductor chip and a decryption initial value associated to the encryption initial value of a decryption rule associated to the encryption rule is stored in the memory element of the second semiconductor chip. The first semiconductor chip has a first data transmission interface formed to generate an encryption data stream from an input data stream using the encryption initial value according to the encryption rule, and the second semiconductor chip has a second data transmission interface formed to receive the encryption data stream and to determine a decryption data stream from the encryption data stream using the decryption initial value according to the decryption rule and to compare the decryption data stream determined to an unexpected data stream. The second data transmission interface is further formed to take a defensive measure against transmitting data from the second data transmission interface to the first data transmission interface when the decryption data stream does not correspond to an expected data stream. The method for operating the device for transmitting in an encrypted manner includes the steps of: encrypting data of the input data stream in the first data transmission interface using the encryption initial value according to the encrypting rule to generate the encryption data stream; transmitting the encryption data stream from the first data transmission interface to the second data transmission interface; decrypting the encryption data stream in the second data transmission interface using the decryption initial value according to the decryption rule to determine the decryption data stream; and taking a defensive measure against transmitting data from the second data transmission interface to the first data transmission interface when the decryption data stream does not correspond to an expected data stream.

In accordance with a third aspect, a method according to the present invention is configured for personalizing a device for transmitting data between two semiconductor chips of data processing means in an encrypted manner, wherein the device for transmitting in an encrypted manner has a non-volatile memory element in each of the two semiconductor chips. An encryption initial value for a decryption rule is stored in the memory element of the first semiconductor chip and a decryption initial value associated to the encryption initial value of a decryption rule associated to the encryption rule is stored in the memory element of the second semiconductor chip. The first semiconductor chip has a first data transmission interface formed to generate an encryption data stream from an input data stream using the encryption initial value according to the encryption rule, and the second semiconductor chip has a second data transmission interface formed to receive the encryption data stream and to determine a decryption data stream from the encryption data stream using the decryption initial value according to the decryption rule and to compare the decryption data stream determined to an expected data stream. The second data transmission interface is also formed to take a defensive measure against transmitting data from the second data transmission interface to the first data transmission interface when the decryption data stream does not correspond to an expected data stream. The method for personalizing the device for an authenticated transmission includes the steps of: providing the encryption initial value and a decryption initial value associated to the encryption initial value; storing the encryption initial value into the non-volatile memory element of the first semiconductor chip and the decryption initial value into the non-volatile memory element of the second semiconductor chip; and protecting the encryption initial value stored in the non-volatile memory element of the first semiconductor chip and the decryption initial value stored in the non-volatile memory element of the second semiconductor chip against alteration.

In accordance with a fourth aspect, the present invention provides a computer program having a program code for performing the above mentioned methods when the computer program runs on a computer.

The present invention is based on the finding of allowing an intercepting and manipulating-safe data transmission between two semiconductor chips by scrambling (or encrypting, wherein scrambling in a general form can also be referred to as encrypting) in the first data transmission interface the input data stream with the data to be transmitted according to a scrambler rule such that the first data transmission interface disposed in the first semiconductor chip will output a scrambler data stream. This scrambler data stream can then be received by the second data transmission interface in the second semiconductor chip and "unpacked" (i.e. a scrambling and/or encryption performed in the first data transmission interface is reversed; correspondingly, descrambling in a general form may also be referred to as decrypting), from which the (original) input data stream with the data to be transmitted may be established. A descrambler rule associated to the scrambler rule is used for this "unpacking". In the present device for an authenticated transmission of data, an essential aspect of the invention is that both for the scrambling in the first data transmission interface a scrambler initial value is used and for descrambling in the second data transmission interface a descrambler initial value associated to the scrambler initial value is used, by means of which, for example, a scrambler in the first data transmission interface and a descrambler in the second data transmission interface are initialized. The scrambler initial value here is stored in a non-volatile memory in the first semiconductor chip, whereas the descrambler initial value is stored in a non-volatile memory of the second semiconductor chip. This allows storing the scrambler and descrambler initial values into each of the two chips already when manufacturing such a two-chip connection so that a sensible evaluation of the data transmitted between the two semiconductor chips will only be possible when knowing the correct (i.e. the respective associated) scrambler and descrambler initial values. If, however, such a matching initial value is stored into each of the two semiconductor chips already when manufacturing the two semiconductor chips, it will be possible with a skillful selection of the initial value that only the two semiconductor chips equipped with the respective associated initial values are able to mutually exchange data in a safe manner. As a defensive measure against transmitting data from the second data transmission interface to the first data transmission interface, approaches, such as, for example, a currentless switching of the second semiconductor chip, a complete stopping of the data exchange between the two semiconductor chips or even an output of random numbers or pseudo-random numbers are employed, in order to confuse a potential attacker. These examples of defensive measures to be performed are, however, only mentioned exemplarily and may be substituted and/or supplemented by any further approaches of defense against an unauthorized interception of a communication known to a person skilled in the art.

The present invention offers the advantage of providing a way for an intercepting and manipulating-safe data communication between two semiconductor chips so that intercepting the communication between the two chips is very difficult and, additionally, a manipulation of the communication, such as, for example, by a man-in-the-middle attack, with regard to a direct, i.e., open communication between the two semiconductor chips, is made considerably more difficult. Furthermore, the present invention offers the advantage that using an initial value-based scrambler and descrambler, respectively, allows, as far as numeric and circuit technology are concerned, a simple data exchange safety which is at the same time considerably improved with regard to a conventional "open" communication.

It is also favorable for the first data transmission interface for generating the scrambler data stream to be formed to link data of the input data stream with auxiliary data, and for the second data transmission interface for determining the input data stream to be formed to link data of the scrambler data stream with further auxiliary data, wherein the auxiliary data and the further auxiliary data are in a predetermined relation to one another. This offers the advantage of not only performing a scrambling, i.e., temporal reordering of the data to be transmitted, but also ensuring a considerable increase in safety of the data transmission by the linking with auxiliary data and further auxiliary data.

Also, the auxiliary data or the further auxiliary data can include random numbers, pseudo-random numbers or a cryptographic key. This offers the possibility of being able to provide such auxiliary numbers in, as far as circuit technology or numeric are concerned, a simple manner. The usage of a cryptographic key also offers the possibility of allowing a further reduction in the circuit-technological or numerical efforts by using a pre-calculated data sequence as a cryptographic key, without compromising the safety of the data transmission.

In addition, the first data transmission interface can include a generator for generating the auxiliary data and the second data transmission interface can include a generator for generating the further auxiliary data, wherein an initial setting of the generator of the first data transmission interface is defined by the scrambler initial value and an initial setting of the generator of the second data transmission interface is defined by the descrambler initial value. Such a design of the present device offers the advantage that this allows a simple implementation of using the scrambler initial value or the descrambler initial value without having to perform, as far as numeric or circuit technology are concerned, a complicated computing operation with the corresponding initial values.

According to a further embodiment of the present invention, the generators can include a stream encryption unit including one or several shift registers (or LFSRs). Generators formed in this way may easily be put into practice by standardized circuit elements.

In a favorable embodiment of the present invention, the first data transmission interface and the second data transmission interface can be formed to perform the linking of the data of the input data stream with the auxiliary data and the linking of the data of the scrambler data stream with the further auxiliary data on the basis of an EXCLUSIVE-OR linking rule. Such an EXCLUSIVE-OR linking has the advantage of a very simple implementation.

Furthermore, the scrambler initial value and the descrambler initial value can be identical. This offers the advantage that the procedure of storing the initial values may be simplified. Identical scrambler initial values and descrambler initial values are used in particular with scramblers and descramblers having the same structure, wherein a cheap way of manufacturing the device for an authenticated transmission results when the scrambler and descrambler have the same structure, such as, for example, by reusing a mask for semiconductor chips.

The first semiconductor chip or the second semiconductor chip can also include means for generating the scrambler initial value and the descrambler initial value, wherein the means for generating is formed to store, in a personalization phase, the scrambler initial value into the memory element of the first semiconductor chip and to store the descrambler initial value into the memory element of the second semiconductor chip. This offers the advantage that the scrambler initializing value and the descrambler initializing value are not generated externally by an algorithm and stored into the corresponding chip, but that the generation of the corresponding initial values takes directly place in the device for an authenticated transmission itself. Thus, this offers a considerable gain in additional safety against "discovering" the scrambler initial value and the descrambler initial value.

In another embodiment of the present invention, the first data transmission interface can further be formed to use a supplementary number for generating the scrambler data stream, and the second data transmission interface can further be formed to determine the input data stream on the basis of the supplementary number, wherein the supplementary number is a random number or a pseudo-random number. By considering such a supplementary number in an authenticated transmission of data between two semiconductor chips, the safety of the data transmission can be increased further since not only must the scrambler and descrambler rules be known, but additionally, the supplementary number has to be considered.

Furthermore, the non-volatile memory element of the first semiconductor chip and the non-volatile memory element of the second semiconductor chip can include an ROM (read-only memory), FROM (factory ROM), PROM (programmable read-only memory), EPROM (electronically PROM) or an electronically switchable fuse. This allows storing the initial values in a simple and, above all, cheap manner.

In another embodiment, the second semiconductor chip can additionally include a third data transmission interface having a volatile memory element and control means, wherein the third data transmission interface can be formed to receive the scrambler data stream and to determine the input data stream from the scrambler data stream using the descrambler initial value according to the descrambler rule, and wherein the control means can be formed to read out the descrambler initial value from the non-volatile memory element of the second semiconductor chip and to transfer same to the volatile memory element of the third data transmission interface. Such a design offers the advantage that further functional elements may be used in the second semiconductor chip with volatile (in particular free programmable) memories which can, depending on the requirements for the function, be designed as a descrambler. Thus, a dynamic configuration of the available computing power may take place, which contributes to a further flexibilization and further acceleration of processing a complex algorithm.

In addition, the first data transmission interface, the second data transmission interface, the third data transmission interface and the control means can be connected to one another by means of a data bus, wherein the control means may be formed to perform the read out of the descrambler initial value from the non-volatile memory element of the second semiconductor chip and the storage of the descrambler initial value into the volatile memory element of the third data transmission interface using the data bus. The control means can further be formed to prevent a transmission of the descrambler initial value to the first data transmission interface when transmitting the descrambler initial value to the volatile memory element of the third data transmission interface. Thus, it can be ensured that the descrambler initial value is not read out from the second semiconductor chip or recognized in any other way, which is how the high safety of the authenticated data transmission can be maintained even when using free configurable functional elements.

Additionally, the scrambler initial value can also be stored in the non-volatile memory element of the second semiconductor chip and the descrambler initial value may also be stored in the non-volatile memory element of the first semiconductor chip. The second data transmission interface can be formed to generate another scrambler data stream from another input data stream using the scrambler initial value stored in the non-volatile memory element of the second semiconductor chip according to the scrambler rule. The first data transmission interface can be formed to receive the further scrambler data stream and to determine the further input data stream from the further scrambler data stream using the descrambler initial value stored in the non-volatile memory element of the first semiconductor chip according to the descrambler rule. This offers the advantage that a bidirectional authenticated data transmission is possible, which has advantageous effects on a flexible partitioning of an algorithm to be processed to the two semiconductor chips.

BRIEF DESCRIPTION OF THE DRAWINGS

A preferred embodiment will be detailed subsequently referring to the appended drawings, in which.

DESCRIPTION OF PREFERRED EMBODIMENTS

Figure 1:
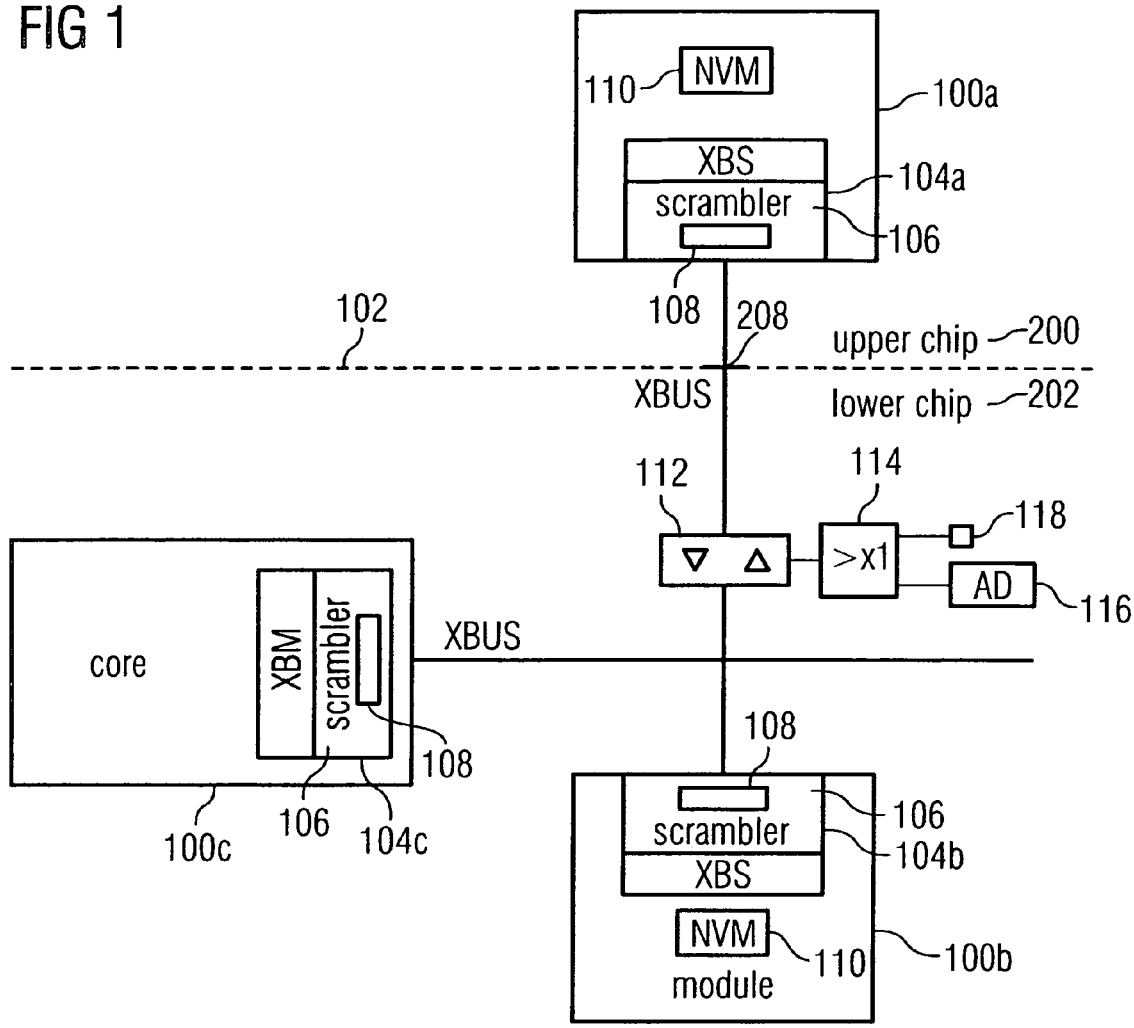
FIG. 1 shows a block circuit diagram of an embodiment of the present invention.

In the Figures, same or similar elements are characterized by same or similar reference numerals, a repeated description of these reference numerals being omitted.

FIG. 1 shows a block circuit diagram of an embodiment of a device according to the present invention. The device illustrated in FIG. 1 includes several functional blocks 100a to 100c which can be disposed in different semiconductor chips. The broken line 102 in FIG. 1 characterizes a partitioning of the association of the functional block 100a to 100c on the upper chip and the lower chip so that the functional block 100a according to FIG. 1 is disposed in the upper chip (i.e. exemplarily in the chip 200 illustrated in FIG. 2) and the functional blocks 100b and 100c are disposed in the lower chip (i.e. in the lower chip 202 in FIG. 2). Each of the three functional units 100a to 100c includes a data transmission interface 104a to 104c, each including a scrambler 106 having a stream encryption unit 108. In addition, each of the three functional units 100a to 100c includes a non-volatile memory 110 (NVM) in which the scrambler initial value or descrambler initial value is stored correspondingly. The first data transmission means 104a is connected to the second data transmission means 104b and the further data transmission means 104c via a data bus XBUS. Data suppressing means 112 (data suppressor) is introduced between the first data transmission interface 104a and the second and the further data transmission interfaces 104b and 104c. The data suppression means 112 can be driven via a switch 114, wherein the switch 114 is connected to an address decoder 116 and a control input 118. To be able to transmit data via the data bus XBUS, the further data transmission interface 104c may act as control means (or as XBus Master XBM), whereas the first data transmission interface 104a and the second data transmission interface 104b act as a data transmission interface (such as, for example, XBus Slaves XBS) depending on the further data transmission interface 104c acting as control means. Furthermore, a random number generator outputting a random signal (in the form of a random number or a random bit) supplied to each of the LFSRs 108 of the individual data transmission interfaces 104a to 104c can be used.

The mode of functioning of such a device for transmitting data between two semiconductor chips, as is illustrated in FIG. 1, can be described as follows. At first, when manufacturing such a two-chip connection, the scrambler initial value is to be written into the non-volatile memory 110 of the first semiconductor chip (i.e., for example, in the first functional block 100a), whereas a corresponding descrambler initial value associated to the scrambler initial value is to be stored into the non-volatile memory 110 of the second semiconductor chip 202 (i.e., for example, in the second functional block 100b).

When a device for transmitting data between two semiconductor chips manufactured in this way is used, an algorithm performed in the first functional block 100a can, for example, provide data in a data stream to be transmitted for further processing to an algorithm or algorithm part in the second functional block 100b. For this, this data stream can be supplied to the first data transmission interface 104a which, using the scrambler as an encryption unit 106 and the scrambler initial value stored in the non-volatile memory 110 of the first semiconductor chip 200, generates a scrambler data stream or encryption data stream. For this, the data of the data stream can, for example, be reordered in their temporal sequence or order, or alternatively or additionally, a linking of the data of the data stream with auxiliary data may take place (such as, for example, for encrypting the data of the data stream). This linking may exemplarily be performed as an EXCLUSIVE-OR linking by means of an EXOR gate (EXOR=EXCLUSIVE-OR); however, another cryptographic linking with a cryptographic key may be employed, such as, for example, a cryptographic stream cipher or block cipher on the basis of a non-linear stream encryption unit bundle. The auxiliary data here may be random numbers, pseudo-random numbers or a cryptographic key. Pseudo-random numbers in this context mean a sequence of numbers which may be generated by an algorithm outputting individual numbers with a certain frequency, independently of the positions where these numbers are in a stream of numbers output by the algorithm. Alternatively, a special predefined arrangement of numbers or bits (such as, for example, a special cryptographic key) may also be used for these auxiliary numbers.

The data of the scrambler data stream can then be transferred from the first data transmission interface 104a from the upper chip 200 via the contact terminals 208 to the lower chip 202, in particular via the data suppressor 112 to the second data transmission interface 104b in the second semiconductor chip 202. The second data transmission interface 104b can reconstruct the input data stream or data of the input data stream from the scrambler data stream, using the scrambler 106 (which in FIG. 1 can also take the function of a descrambler or a decryption unit and is only referred to as scrambler for reasons of illustration) and the descrambler initial value stored in the non-volatile memory 110 of the second semiconductor chip 202. It is of great importance here that the scrambler rule used in the first functional block 100a of the scrambler 106 is also known (such as, for example, is implicitly known by the descrambler rule associated to the scrambler rule) in the second functional block 100b, which allows re-determining the scrambler data stream emitted by the first data transmission interface 104a. Here, it is also necessary for the scrambler initial value stored in the non-volatile memory 110 of the first semiconductor chip 200 (upper chip) to be in a predetermined relation to the descrambler initial value which is stored in the non-volatile memory 110 of the second semiconductor chip 202 (lower chip). If a potential attacker separated the two chips and had access to the data communication between the two chips via the contact terminals 208, he or she would have to know the scrambler and descrambler rules and the scrambler and descrambler initial values, respectively, for evaluating the data transmission between the two semiconductor chips. With a suitable selection of scrambler and descrambler rules and favorable scrambler and descrambler initial values (in particular when selecting scrambler and descrambler initial values from a large amount of possible initial values), a considerable increase in safety of such a data transmission may be realized compared to an unprotected transmission between the two chips. As has already been mentioned above, scrambling can generally also be interpreted as encryption, correspondingly descrambling is to be interpreted as decryption.

Furthermore, data can also be transmitted in a reversed direction (i.e. departing from the second data transmission interface 104b via the data bus XBUS, the data suppressor 112 and the contact point 108 to the first data transmission interface 104a). In this case, the functionalities of the scrambler and descrambler described above would be exchanged, i.e. the scrambler initial value would be stored in the non-volatile memory 110 of the second semiconductor chip 202, the scrambler 106 of the second functional unit 104b would execute the scrambler rule, the scrambler 106 in the first functional unit 104a would execute the corresponding descrambler rule, whereas the descrambler initial value would be stored in the non-volatile memory 110 of the first semiconductor chip 200. Here, it must be ensured that the functional units referred to as scrambler 106 are able to execute both the scrambler rule and the descrambler rule, which, in today's data processing apparatuses, usually is not a problem and such a reconfiguration is known to a person skilled in the art.

In order to effect a further increase in safety of such a data transmission between two semiconductor chips, a random number generator RNG may additionally be employed. This random number generator RNG generates random numbers reseed (or random bits) supplied to each LFSR connected. These random numbers generated by the random number generator RNG serve to consider, at certain points in time, the random number or the random bit when executing the scrambler and/or descrambler rules according to a predefined considering rule. The fact that this random bit is accessible to all LFSRs 108 taking part in the data transmission always allows recognizing an effect of the random number or the random bit on the scrambler data stream when knowing the scrambler and/or descrambler rules and the considering rule, since both the value and the point in time of the random number or random bit considered are known.

When another functional unit for supporting or accelerating the processing of the algorithm to be executed is exemplary used within the chip (which is unproblematic as far as safety is concerned), it is necessary for the further functional unit (not illustrated in FIG. 1) to be able to take part in the safe data transmission between the first semiconductor chip 200 and the second semiconductor chip 202. For this, the descrambler initial value can exemplarily be read out from the non-volatile memory 110 of the second semiconductor chip 202 and be transmitted to the further functional block not illustrated. For this, the third functional block 100c with the further data transmission interface 104c, formed as an XBus Master, can effect a query of the descrambler initial value from the non-volatile memory 110 of the second semiconductor chip 202 and transmit the descrambler initial value read out via the data bus XBus to the further functional block comprising the third data transmission interface which is setup in analogy to the first and second data transmission interfaces 104a and 104b (i.e., also acts as an XBus Slave).

However, it must be ensured with such a transmission of the descrambler initial value that the descrambler initial value is not accessible outside the second semiconductor chip 202, i.e., not transmitted via the contact terminal 108. The data suppressor 112 controllable via the switch 113 may be employed for this. If, for example, the read out signal of the further data transmission interface 104c is recognized by the address decoder 116 AD, the external access to the XBus from the contact terminals 208 may be suppressed so that the descrambler initial value cannot be read outside the second semiconductor chip 202. Exemplarily, an enable signal may be applied to the terminal 118, according to the state of which the data suppressor 112 suppresses the data transmission to the first data transmission interface (or vice versa) such that an error signal may exemplarily also be evaluated via the terminal 118, the error signal indicating that the two semiconductor chips have been separated from each other. An error signal designed in this way would still increase the safety of the data transmission since in this case even the direct separation of the two semiconductor chips could result in suppressing a data transmission via the contact terminals 208.

A transmission of the descrambler initial value to the first functional block 100a in the first semiconductor chip 200 is not required since a corresponding initial value has already been set in a personalization phase (i.e. in the factory) and thus the initial value required for the safe data transmission is already known to the first semiconductor chip 200.

In summary, it is to be noted that the present invention provides for the mutual authentication to take place by means of bus encryption or bus scrambling. According to an embodiment of the present invention, the data transported via a data bus connecting the two semiconductor chips are scrambled (i.e. some or all data are altered in their temporal order before being transmitted via the data bus and/or subjected to an EXCLUSIVE-OR linking with the value of a pseudo-random number generator, such as, for example, the LFSR). In order to give the sequence of numbers of the LFSR a less "random" character, a random bit of the random number generator RNG is "attributed" to the LFSR from time to time.

A communication between the two semiconductor chips as system components is in particular possible when they have a respective matching (or the same) initial value of the LFSRs and are equally triggered and reset with the random bit of the random number generator RNG.

Preferably, the initial value of the LFSR may be designed individually for a chip and thus the mutual authentication may be possible implicitly since an upper chip will only "understand" its corresponding lower chip correctly when the functional blocks thereof have the same LFSR initial value (i.e. operate with a corresponding scrambler and pertaining descrambler rule and a scrambler initial value and a pertaining descrambler initial value).

Put differently, it may be noted that corresponding initial values for scrambling and descrambling are used for a mutual authentication of two semiconductor chips associated to each other.

Figure 2:
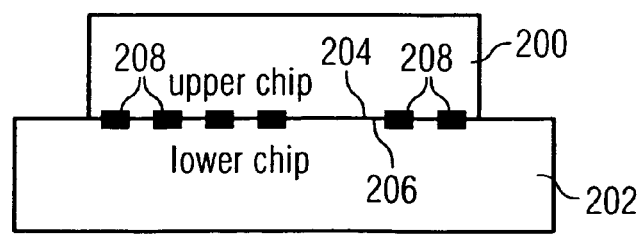
FIG. 2 shows a two-chip connection corresponding to the prior art.

A concrete scenario of usage for the device described above is illustrated as follows:

In a first personalization phase, which is performed by the manufacturer, i.e., in a manufacturing factory of the semiconductor chip, two semiconductor chips, such as, for example, the upper chip 200 and the lower chip 202 illustrated in FIG. 2, are personalized such that exemplarily the lower chip 202 generates a random number (exemplarily by means of a random number generator on the lower chip 202) and this random number cannot be predicted and/or is not known outside the chip). Alternatively, a random number may also be generated at an external device and supplied to the two chips. Subsequently, this random number (and, if appropriate, a corresponding complement) is stored correspondingly in the non-volatile memory of the upper chip 200 and in the non-volatile memory of the lower chip 202. When, for example, the upper chip 200 does not have a conventional non-volatile memory, such as, for example, an ROM, PROM, FPROM, EPROM or flash, fuses may be used instead (i.e., wiring networks which may be programmed irreversibly by electrical currents).

After such a personalization, the actual determined usage of such a two-chip component takes place, wherein at first the data of the data transmission bus with the default initial value (which is, for example, mask-individual) are scrambled. Subsequently, the core which is exemplarily illustrated in FIG. 1 by the third functional block 100c, may read out the descrambler initial value for the scrambler 106 generated in personalization (or in this case acting as a descrambler) from the non-volatile memory 110 of the second semiconductor chip 202 and emit this descrambler initial value using a broadcast instruction to all the XBus Slaves of the system:

The initial value read out must not be transported via the F2F interface. A special decoder, such as, for example, the data suppressor 112 illustrated in FIG. 1, can recognize the broadcast instruction and suppress the pertaining data transport (i.e., the transmission of the initial value broadcast). The XBus Slaves of the upper chip 200 thus only contain the broadcast instruction, but not the new initial value. This is not necessary since during personalization the chip-individual initial value has also been stored in the non-volatile memory (such as, for example, the eFuses) of the upper chip 200; the only thing left is to load this values from the non-volatile memory 110 of the upper chip 200 to the corresponding XBus Slaves.

It is to be noted with regard to the (pseudo) random number generator that the exemplarily used LFSR as a pseudo-random number generator might no longer be sufficiently safe against simple cryptographic attacks in the future. In this case, the LFSR may be replaced by a cryptographic stream cipher which are exemplarily based on non-linear stream encryption unit bundles.

Depending on the circumstances, the present method for operating a device for an authenticated transmission of data and the present method for personalizing a device for an authenticated transmission of data can be implemented in either hardware or software. The implementation may be on a digital memory medium, in particular on a disc or CD having control signals which can be read out electronically, which can cooperate with a programmable computer system so as to execute the corresponding method. In general, the invention also is in a computer program product having a program code stored on a machine-readable carrier for performing one of the methods of the present invention when the computer program product runs on a computer. Put differently, the invention can also be realized as a computer program having a program code for performing one of the present methods when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for transmitting data between two semiconductor chips of a data processor in an encrypted manner, wherein a first semiconductor chip is connected to a second semiconductor chip, the device comprising:
a non-volatile memory element in each of the two semiconductor chips, wherein an encryption initial value for an encryption rule is stored in the memory element of the first semiconductor chip and a decryption initial value associated to the encryption initial value for a decryption rule associated to the encryption rule is stored in the memory element of the second semiconductor chip;
wherein the first semiconductor chip comprises a first data transmission interface formed to generate an encryption data stream from an input data stream using the encryption initial value according to the encryption rule;
wherein the second semiconductor chip comprises a second data transmission interface formed to receive the encryption data stream and to generate a decryption data stream from the encryption data stream using the decryption initial value according to the decryption rule and to compare the decryption data stream generated to an expected data stream, wherein the second data transmission interface is also formed to perform a defensive measure against transmitting data from the second data transmission interface to the first data transmission interface when the decryption data stream does not correspond to the expected data stream,
wherein the second semiconductor chip is formed to execute a predefined sequence of machine-executable instructions determined from the expected data stream, wherein the second data transmission interface is formed to determine a machine-executable instruction from the decryption data stream, and wherein the second data transmission interface is also formed to perform the defensive measure against transmitting data from the second data transmission interface to the first data transmission interface when the machine-executable instruction determined from the decryption data stream does not correspond to a machine-executable instruction according to the predefined sequence of machine-executable instructions.

2. The device according to claim 1, wherein the encryption rule is an algorithm for outputting one of a stream cipher and an algorithm for performing a block encryption.

3. The device according to claim 1, wherein the two semiconductor chips are disposed such that a first pad of the first semiconductor chip is opposite a second pad of the second semiconductor chip.

4. The device for transmitting in an encrypted manner according to claim 1, wherein the first data transmission interface for generating the encryption data stream is formed to link data of the input data stream with auxiliary data, and wherein the second data transmission interface for determining the decryption data stream is formed to link data of the encryption data stream with further auxiliary data, the auxiliary data and the further auxiliary data being in a predetermined relation to one another.

5. The device for transmitting in an encrypted manner according to claim 4, wherein at least one of the auxiliary data or the further auxiliary data includes at least one of random numbers, pseudo-random numbers and a cryptographic key.

6. The device for transmitting in an encrypted manner according to claim 5, wherein the first data transmission interface includes a generator for generating the auxiliary data and the second data transmission interface includes a generator for generating the further auxiliary data, and wherein an initial setting of the generator of the first data transmission interface is defined by the encryption initial value and an initial setting of the generator of the second data transmission interface is defined by the decryption initial value.

7. The device for transmitting in an encrypted manner according to claim 6, wherein the generators include a stream encryption unit.

8. The device for transmitting in an encrypted manner according to claim 7, wherein the generators include a stream encryption unit including linear or non-linear feedback shift registers.

9. The device for transmitting in an encrypted manner according to claim 4, wherein the first data transmission interface and the second data transmission interface are formed to perform the linking of the data of the input data stream with the auxiliary data and the linking of the data of the encryption data stream with the further auxiliary data on the basis of an EXCLUSIVE-OR linking rule.

10. The device for transmitting in an encrypted manner according to claim 1, wherein the encryption initial value and the decryption initial value are identical.

11. The device for transmitting in an encrypted manner according to claim 1, wherein the encryption initial value and the decryption initial value are different.

12. The device for transmitting in an encrypted manner according to claim 1, wherein at least one of the first semiconductor chip and the second semiconductor chip includes a generator for generating the encryption initial value and the decryption initial value, wherein the generator for generating is formed to store, in a personalization phase, the encryption initial value into the memory element of the first semiconductor chip and store the decryption initial value into the memory element of the second semiconductor chip.

13. The device for transmitting in an encrypted manner according to claim 1, wherein the first data transmission interface is also formed to use a supplementary number for generating the encryption data stream, and wherein the second data transmission interface is also formed to perform the determination of the decryption data stream on the basis of the supplementary number, the supplementary number being a random number or a pseudo-random number.

14. The device for transmitting in an encrypted manner according to claim 1, wherein the non-volatile memory element of the first semiconductor chip and the non-volatile memory element of the second semiconductor chip includes at least one of an ROM, FROM, PROM, EPROM and an electronically switchable fuse.

15. The device for transmitting in an encrypted manner according to claim 1, wherein the second semiconductor chip further includes a controller, wherein the first and second data transmission interfaces comprise a stream encryption unit for performing the decryption formed to determine the encryption data stream correspondingly from the input data stream using the encryption initial value according to the encryption rule and to determine the decryption data stream from the encryption data stream using the decryption initial value according to the decryption rule, wherein shift registers are formed to pass a plurality of states for encrypting and decrypting, and wherein the controller is formed to set the shift registers of the first data transmission interface and the second data transmission interface to a defined state.

16. The device for transmitting in an encrypted manner according to claim 15, wherein the second semiconductor chip further includes a third data transmission interface, wherein the third data transmission interface comprises a stream encryption unit for performing the decryption formed to determine the decryption data stream from the encryption data stream using the decryption initial value according to the decryption rule, wherein the stream encryption unit of the third data transmission interface is formed to pass a plurality of states for decryption, and wherein the controller is formed to read out a state of the stream encryption unit of the second data transmission interface and to set the stream encryption unit of the third data transmission interface to the read out state of the stream encryption unit of the second data transmission interface.

17. The device for transmitting in an encrypted manner according to claim 15, wherein further the first data transmission interface, the second data transmission interface and the controller are connected to one another by means of a data bus, wherein the controller is formed to perform setting of the stream encryption unit of the first and second data transmission interfaces using the data bus, and wherein the controller is further formed to perform setting of the stream encryption unit such that when setting the stream encryption unit of the second data transmission interface by means of the data bus an signal is transmitted to the first data transmission interface, the signal containing information on the state to which the second data transmission interface is set.

18. The device for transmitting in an encrypted manner according to claim 15, wherein the controller is formed to set the stream encryption unit of the first and second data transmission interfaces to the state corresponding to the encryption initial value and the decryption initial value.

19. The device for transmitting in an encrypted manner according to claim 1, wherein the encryption initial value is stored in the non-volatile memory element of the second semiconductor chip and the decryption initial value is stored in the non-volatile memory element of the first semiconductor chip, wherein the second data transmission interface is formed to generate a further encryption data stream from a further input data stream using the encryption initial value stored in the non-volatile memory element of the second semiconductor chip according to the encryption rule, and wherein the first data transmission interface is formed to receive the further encryption data stream and to determine the further input data stream from the further encryption data stream using the decryption initial value stored in the non-volatile memory element of the first semiconductor chip according to the decryption rule.

20. The device according to claim 1, wherein the first data transmission interface is formed to use a scrambling rule as the encryption rule, and wherein the second data transmission interface is formed to use a descrambling rule as the decryption rule.

21. A method for operating a device for transmitting data between two semiconductor chips of a data processor in an encrypted manner, comprising:
providing the device which is configured for transmitting in an encrypted manner comprises a non-volatile memory element in each of the two semiconductor chips, wherein an encryption initial value for an encryption rule is stored in the memory element of the first semiconductor chip and a decryption initial value associated to the encryption initial value of a decryption rule associated to the encryption rule is stored in the memory element of the semiconductor chip, wherein the first semiconductor chip comprises a first data transmission interface formed to generate an encryption data stream from an input data stream using the encryption initial value according to the encryption rule, and wherein the second semiconductor chip comprises a second data transmission interface formed to receive the encryption data stream and to determine a decryption data stream from the encryption data stream using the decryption initial value according to the decryption rule and to compare the decryption data stream determined to an expected data stream, wherein the second data transmission interface is also formed to take a defensive measure against transmitting data from the second data transmission interface to the first data transmission interface when the decryption data stream does not correspond to an expected data stream, and wherein the second semiconductor chip is formed to execute a predefined sequence of machine-executable instructions determined from the expected data stream, wherein the second data transmission interface is formed to determine a machine-executable instruction from the decryption data stream, and wherein the second data transmission interface is also formed to perform the defensive measure against transmitting data from the second data transmission interface to the first data transmission interface when the machine-executable instruction determined from the decryption data stream does not correspond to a machine-executable instruction according to the predefined sequence of machine-executable instructions;
encrypting data of the input data stream in the first data transmission interface using the encryption initial value according to the encryption rule to generate the encryption data stream;
transmitting the encryption data stream from the first data transmission interface to the second data transmission interface;
decrypting the encryption data stream in the second data transmission interface using the decryption initial value according to the decryption rule to determine the decryption data stream; and
taking a defensive measure against a transmission of data from the second data transmission interface to the first data transmission interface when the decryption data stream does not correspond to an expected data stream.

22. A method for personalizing a device for transmitting data between two semiconductor chips of a data processor in an encrypted manner, comprising:
providing the device which is configured for transmitting in an encrypted manner comprises a non-volatile memory element in each of the two semiconductor chips, wherein an encryption initial value for an encryption rule is stored in the memory element of the first semiconductor chip and a decryption initial value associated to the encryption initial value of a decryption rule associated to the encryption rule is stored in the memory element of the second semiconductor chip, wherein the first semiconductor chip comprises a first data transmission interface formed to generate an encryption data stream from an input data stream using the encryption initial value according to the encryption rule, and wherein the second semiconductor chip comprises a second data transmission interface formed to receive the encryption data stream and to determine a decryption data stream from the encryption data stream using the decryption initial value according to the decryption rule and to compare the decryption data stream determined to an expected data stream, wherein the second data transmission interface is also formed to take a defensive measure against a transmission of data from the second data transmission interface to the first data transmission interface when the decryption data stream does not correspond to an expected data stream, and wherein the second semiconductor chip is formed to execute a predefined sequence of machine-executable instructions determined from the expected data stream, wherein the second data transmission interface is formed to determine a machine-executable instruction from the decryption data stream, and wherein the second data transmission interface is also formed to perform the defensive measure against transmitting data from the second data transmission interface to the first data transmission interface when the machine-executable instruction determined from the decryption data stream does not correspond to a machine-executable instruction according to the predefined sequence of machine-executable instructions;
providing the encryption initial value and a decryption initial value associated to the encryption initial value;
storing the encryption initial value into the non-volatile memory element of the first semiconductor chip and the decryption initial value into the non-volatile memory element of the second semiconductor chip; and
protecting the encryption initial value stored in the non-volatile memory element of the first semiconductor chip and the decryption initial value stored in the non-volatile memory element of the second semiconductor chip against alteration.

23. A computer program having a program code stored on a non-transitory computer readable medium for performing a method for operating a device for transmitting data between two semiconductor chips of a data processor in an encrypted manner, wherein the device for transmitting in an encrypted manner comprises a non-volatile memory element in each of the two semiconductor chips, wherein an encryption initial value for an encryption rule is stored in the memory element of the first semiconductor chip and a decryption initial value associated to the encryption initial value of a decryption rule associated to the encryption rule is stored in the memory element of the semiconductor chip, wherein the first semiconductor chip comprises a first data transmission interface formed to generate an encryption data stream from an input data stream using the encryption initial value according to the encryption rule, and wherein the second semiconductor chip comprises a second data transmission interface formed to receive the encryption data stream and to determine a decryption data stream from the encryption data stream using the decryption initial value according to the decryption rule and to compare the decryption data stream determined to an expected data stream, wherein the second data transmission interface is also formed to take a defensive measure against transmitting data from the second data transmission interface to the first data transmission interface when the decryption data stream does not correspond to an expected data stream, wherein the second semiconductor chip is formed to execute a predefined sequence of machine-executable instructions determined from the expected data stream, wherein the second data transmission interface is formed to determine a machine-executable instruction from the decryption data stream, and wherein the second data transmission interface is also formed to perform the defensive measure against transmitting data from the second data transmission interface to the first data transmission interface when the machine-executable instruction determined from the decryption data stream does not correspond to a machine-executable instruction according to the predefined sequence of machine-executable instructions, and wherein the method for operating the device for transmitting in an encrypted manner comprises:
encrypting data of the input data stream in the first data transmission interface using the encryption initial value according to the encryption rule to generate the encryption data stream;
transmitting the encryption data stream from the first data transmission interface to the second data transmission interface;
decrypting the encryption data stream in the second data transmission interface using the decryption initial value according to the decryption rule to determine the decryption data stream; and
taking a defensive measure against a transmission of data from the second data transmission interface to the first data transmission interface when the decryption data stream does not correspond to an expected data stream,
when the computer program runs on a computer.

24. A computer program having a program code stored on a non-transitory computer readable medium for performing a method for personalizing a device for transmitting data between two semiconductor chips of a data processor in an encrypted manner, wherein the device for transmitting in an encrypted manner comprises a non-volatile memory element in each of the two semiconductor chips, wherein an encryption initial value for an encryption rule is stored in the memory element of the first semiconductor chip and a decryption initial value associated to the encryption initial value of a decryption rule associated to the encryption rule is stored in the memory element of the second semiconductor chip, wherein the first semiconductor chip comprises a first data transmission interface formed to generate an encryption data stream from an input data stream using the encryption initial value according to the encryption rule, and wherein the second semiconductor chip comprises a second data transmission interface formed to receive the encryption data stream and to determine a decryption data stream from the encryption data stream using the decryption initial value according to the decryption rule and to compare the decryption data stream determined to an expected data stream, wherein the second data transmission interface is also formed to take a defensive measure against a transmission of data from the second data transmission interface to the first data transmission interface when the decryption data stream does not correspond to an expected data stream, wherein the second semiconductor chip is formed to execute a predefined sequence of machine-executable instructions determined from the expected data stream, wherein the second data transmission interface is formed to determine a machine-executable instruction from the decryption data stream, and wherein the second data transmission interface is also formed to perform the defensive measure against transmitting data from the second data transmission interface to the first data transmission interface when the machine-executable instruction determined from the decryption data stream does not correspond to a machine-executable instruction according to the predefined sequence of machine-executable instructions, and wherein the method for personalizing the device for an authenticated transmission comprises:

providing the encryption initial value and a decryption initial value associated to the encryption initial value;

storing the encryption initial value into the non-volatile memory element of the first semiconductor chip and the decryption initial value into the non-volatile memory element of the second semiconductor chip; and protecting the encryption initial value stored in the non-volatile memory element of the first semiconductor chip and the decryption initial value stored in the non-volatile memory element of the second semiconductor chip against alteration, when the computer program runs on a computer.

25. A device for transmitting data between two semiconductor chips of a data processor in an encrypted manner, wherein a first semiconductor chip is connected to a second semiconductor chip, the device comprising:

a non-volatile memory element in each of the two semiconductor chips, wherein an encryption initial value for an encryption rule is stored in the memory element of the first semiconductor chip and a decryption initial value associated to the encryption initial value for a decryption rule associated to the encryption rule is stored in the memory element of the second semiconductor chip, wherein the first semiconductor chip comprises a first data transmission interface formed to generate an encryption data stream from an input data stream using the encryption initial value according to the encryption rule, wherein the second semiconductor chip comprises a second data transmission interface formed to receive the encryption data stream and to generate a decryption data stream from the encryption data stream using the decryption initial value according to the decryption rule and to compare the decryption data stream generated to an expected data stream, wherein the second data transmission interface is also formed to perform a defensive measure against transmitting data from the second data transmission interface to the first data transmission interface when the decryption data stream does not correspond to the expected data stream, wherein the second semiconductor chip comprises an additional functional unit that may be used to support processing of an algorithm, wherein in case the additional functional unit is used, the decryption initial value is transmitted within the second semiconductor chip from the memory to the additional functional unit, and wherein, in response to a signal requesting the decryption initial value from the memory, an external access to the second semiconductor chip is suppressed.

\* \* \* \* \*